United States Patent
Yang (10) Patent No.: US 7,486,493 B2
(45) Date of Patent: *Feb. 3, 2009

(54) OVER-POWER PROTECTION CIRCUIT FOR POWER CONVERTER

(75) Inventor: Ta-Yung Yang, Milpitas, CA (US)

(73) Assignee: System General Corporation, Taipei Hsien (TW)

( * ) Notice: Subject to any disclaimer, the term of this patent is extended or adjusted under 35 U.S.C. 154(b) by 395 days.

This patent is subject to a terminal disclaimer.

(21) Appl. No.: 11/293,136

(22) Filed: Dec. 5, 2005

(65) Prior Publication Data

US 2006/0227476 A1 Oct. 12, 2006

(30) Foreign Application Priority Data

Apr. 7, 2005 (CN) .................. 2005 1 0062700

(51) Int. Cl.
*H02H 3/20* (2006.01)
(52) U.S. Cl. .................................... 361/91.1
(58) Field of Classification Search ............... 361/91.1
See application file for complete search history.

(56) References Cited

U.S. PATENT DOCUMENTS

| | | | | |
|---|---|---|---|---|
| 4,777,331 A | * | 10/1988 | Borst | 178/120 |
| 5,687,066 A | * | 11/1997 | Cook, II | 363/89 |
| 5,796,270 A | * | 8/1998 | Fifield et al. | 326/86 |
| 6,137,668 A | * | 10/2000 | Feldtkeller | 361/103 |
| 6,418,002 B1 | * | 7/2002 | Yang et al. | 361/90 |
| 2004/0184206 A1 | * | 9/2004 | Nomura et al. | 361/31 |
| 2004/0207967 A1 | * | 10/2004 | Ohshima | 361/93.1 |

* cited by examiner

*Primary Examiner*—Stephen W Jackson
*Assistant Examiner*—Ann T Hoang
(74) *Attorney, Agent, or Firm*—Rosenberg, Klein & Lee (57) ABSTRACT

The present invention proposes an over-power protection apparatus for a power converter. An oscillator outputs a clock signal. By comparing a sense signal with a threshold signal, an over-power comparative unit outputs a protection signal to an accumulating trigger unit. The accumulating trigger unit is accumulating and counting the protection signal in response to the clock signal. The accumulating trigger unit further outputs an off signal to a latch unit as a period of the protection signal reaches a predetermined clock counts. In response to the off signal, the latch unit outputs a latch signal to a driving output unit for disabling a switching signal to a power switch. Therefore, the power switch is turned off and the over-power protection can be accomplished.

18 Claims, 9 Drawing Sheets

FIG. 9

OVER-POWER PROTECTION CIRCUIT FOR POWER CONVERTER

BACKGROUND OF THE INVENTION

1. Field of the Invention

The present invention relates generally to an over-power protection circuit, and more specifically to the over-power protection circuit used for a switching mode power converter.

2. Description of Related Art

Various power converters have been widely used to provide a regulated voltage and current. For the sake of safety reasons, an over-power protection means must be provided to protect both the power converter itself and the system it powers. A limited power output is thus required for the power converter during the conditions for overloading, short-circuit and feedback open loop.

Figure 1:
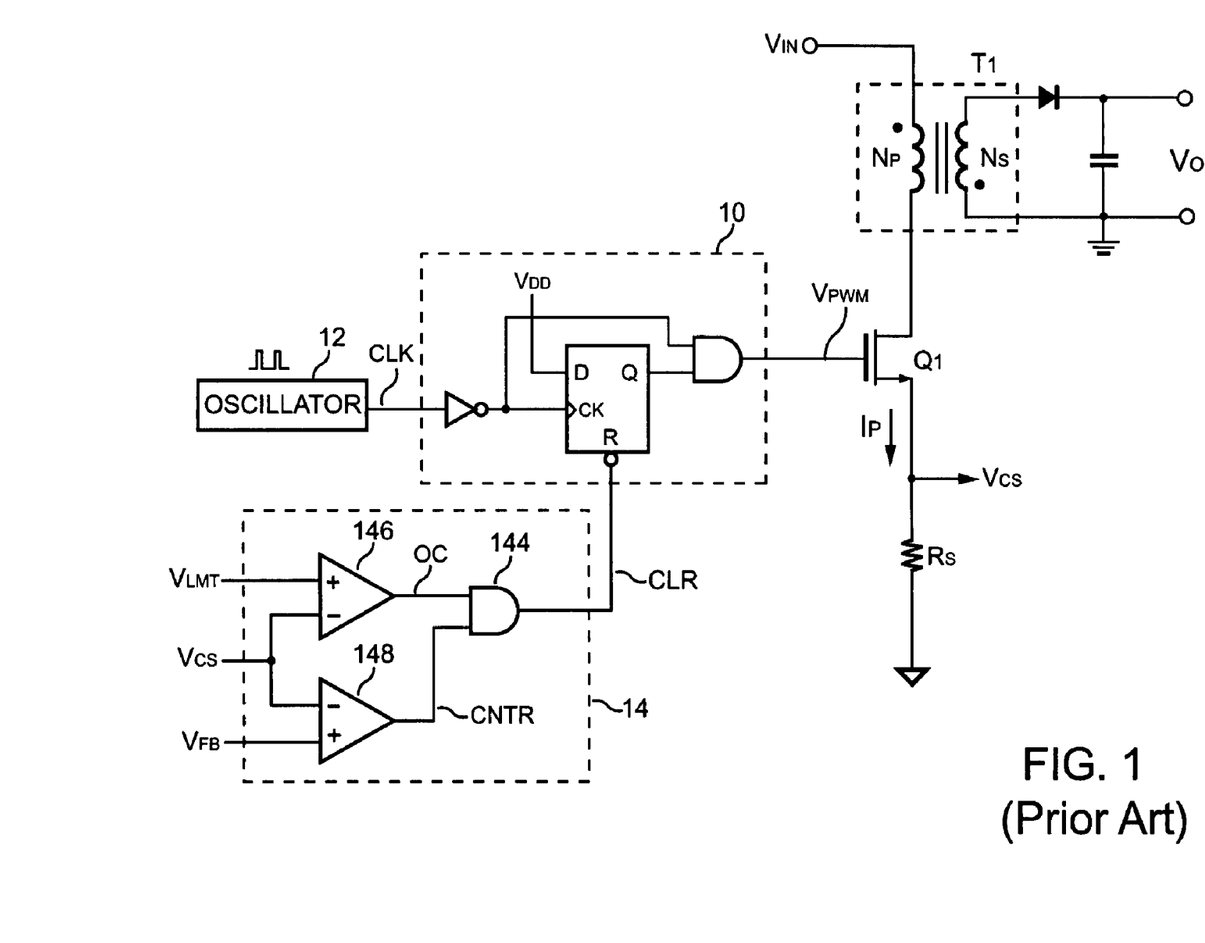
FIG. 1 shows a schematic diagram of a conventional power converter.

FIG. 1 illustrates the topology of a conventional power converter comprising a transformer $T_1$, a driving control unit 14, a driving output unit 10, an oscillator 12 and a switching device $Q_1$. A primary-side switching current $I_p$ of the transformer $T_1$, generates a current sense signal $V_{CS}$ through a current sense resistor $R_S$. The driving control unit 14 receives a feedback signal $V_{FB}$ from the output of the power converter. The driving control unit 14 includes a connection unit 144, a power limit comparator 146 and a PWM comparator 148. An input of the power limit comparator 146 and the PWM comparator 148 connects to the current sense resistor $R_S$ to receive the current sense signal $V_{CS}$. The other input of the power limit comparator 146 connects to a maximum power signal $V_{LMT}$. The other input of the PWM comparator 148 connects to the output of the power converter to receive the feedback signal $V_{FB}$. The power limit comparator 146 generates an over current signal OC as the current sense signal $V_{CS}$ is higher than the maximum power signal $V_{LMT}$. The PWM comparator 148 outputs a feedback control signal CNTR as the current sense signal $V_{CS}$ is higher than the feedback signal $V_{FB}$. The over current signal OC and the feedback control signal CNTR generate a clear signal CLR via the connection unit 144.

The driving output unit 10 generates a switching signal $V_{PWM}$ to switch a switching device in response to a clock signal CLK of the oscillator 12 and the clear signal CLR of the driving control unit 14.

The feedback control signal CNTR is generated when the signal $V_{CS}$ is higher than the feedback signal $V_{FB}$. The over current signal OC is generated when the signal $V_{CS}$ is higher than the maximum power signal $V_{LMT}$. The clear signal CLR is adjusted by the feedback control signal CNTR or the over current signal OC for controlling the driving output unit 10 to periodically disable the switching signal $V_{PWM}$. Therefore, the output of the power converter is regulated, and the primary switching current and the maximum power are limited further.

However, the power converter of a printer or a scanner has to provide a large output power and torque to the motor as the input power of the power converter starts up in the practical application. Meanwhile, the over-current and over-power occurs and causes the power converter performing an improper protecting action. The traditional power converter often employs an over design for providing a maximum output power to satisfy a motor load needed. In other words, the traditional power converter must provide a peak power and extends the duration to the motor load. Conventionally, the main power switch and the other power devices have to increase the voltage/current stress, so the cost due to the peak power is always higher than the maximum output power.

Therefore, it is very important to provide a proper protection and to avoid an erroneous judgment for the PWM controller of the power converter.

SUMMARY OF THE INVENTION

The present invention proposes an over power protection circuit used for a power converter. A limited output power is thus required to count the period of the fault conditions of the power converter by various comparing level during the conditions for overloading, short-circuit and feedback open loop. The object of the present invention is to provide a switching signal to periodically disable or latch off the output power of the power converter as the period of the fault conditions reaches a predetermined clock counts.

An over-power protection circuit used for the power converter comprises an oscillator to generate a clock signal. An over-power comparing unit receives a sense signal and a threshold signal for generating a protection signal in response to the comparison between the sense signal and the threshold signal. An accumulating trigger unit obtains the protection signal from the over-power comparing unit. The accumulating trigger unit generates an off signal to a latch unit by accumulating and counting the protection signal as the count of the protection signals reaches a predetermine value. The latch unit generates a latch signal to a driving output unit for latching off the switching signal to the power switch.

An over-power protection circuit used for power converter provides a proper protection during the conditions for overloading, short-circuit and feedback open loop in accordance with present invention. Furthermore, through accumulating and counting the period of the fault conditions, the over-power protection circuit is used to avoid an improper protection for a larger output power needed in a very short period for the power converter.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 2:
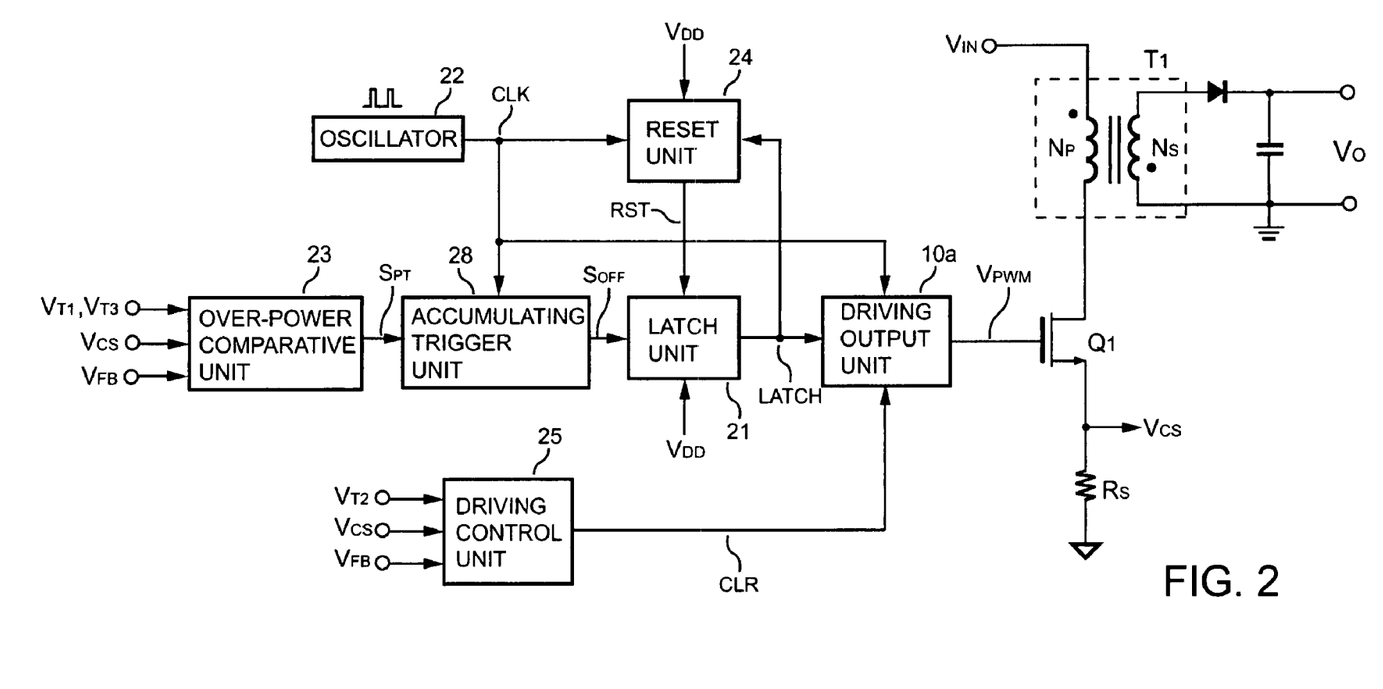
FIG. 2 shows a schematic diagram of the power converter according to the present invention.

FIG. 2 shows a schematic diagram of a power converter according to the present invention. An over-power protection apparatus for a power converter comprises an over-power comparative unit 23. The over-power comparative unit 23 generates a protection signal $S_{PT}$ for receiving a sense signal in response to the comparison between the sense signal and a threshold signal. An accumulating trigger unit 28 couples to the over-power comparative unit 23 and an oscillator 22 for generating an off signal $S_{OFF}$ in response to a clock signal CLK and the protection signal $S_{PT}$. The accumulating trigger unit 28 is to accumulate and count the protection signal $S_{PT}$ and generates the off signal $S_{OFF}$ as a period of the protection signal $S_{PT}$ reaches a predetermined clock counts. A latch unit 21 couples to the accumulating trigger unit 28 for generating a latch signal LATCH in response to the off signal $S_{OFF}$. A driving output unit 10a couples to the latch unit 21 and the oscillator 22 for latch-off a switching signal $V_{PWM}$ to a power switch $Q_1$ in response to the clock signal CLK and the latch signal LATCH. Therefore, the power switch is turned off and the over-power protection can be accomplished.

A driving control unit 25 couples to the driving output unit 10a in response to a current sense signal $V_{CS}$, a voltage feedback sense signal $V_{FB}$ and a second threshold signal $V_{T2}$. The second threshold signal $V_{T2}$ is a limited value of the maximum output power of the power converter. Once the current sense signal $V_{CS}$ rises to the second threshold signal $V_{T2}$ or the voltage feedback sense signal $V_{FB}$, the driving control unit 25 will output a clear signal CLR to the driving output unit 10a for periodically disabling the switching signal $V_{PWM}$ to the power switch $Q_1$. Therefore, the power switch $Q_1$ is turned off and the over-power protection can be accomplished.

Referring to FIG. 2, the over-power protection apparatus further comprises a reset unit 24 coupled to a supply voltage $V_{DD}$, the latch unit 21 and the oscillator 22 for generating a reset signal RST to the latch unit 21 for resetting the latch unit 21 in response to the clock signal CLK and the latch signal LATCH. The reset signal RST is generated after a time delay of the latch signal LATCH. The reset unit 24 further couples to a supply voltage $V_{DD}$ for receiving a low voltage signal and generating a reset signal RST to reset said latch unit 21 in accordance with restarting the power source of the power converter and the supply voltage shortage.

Figure 3:
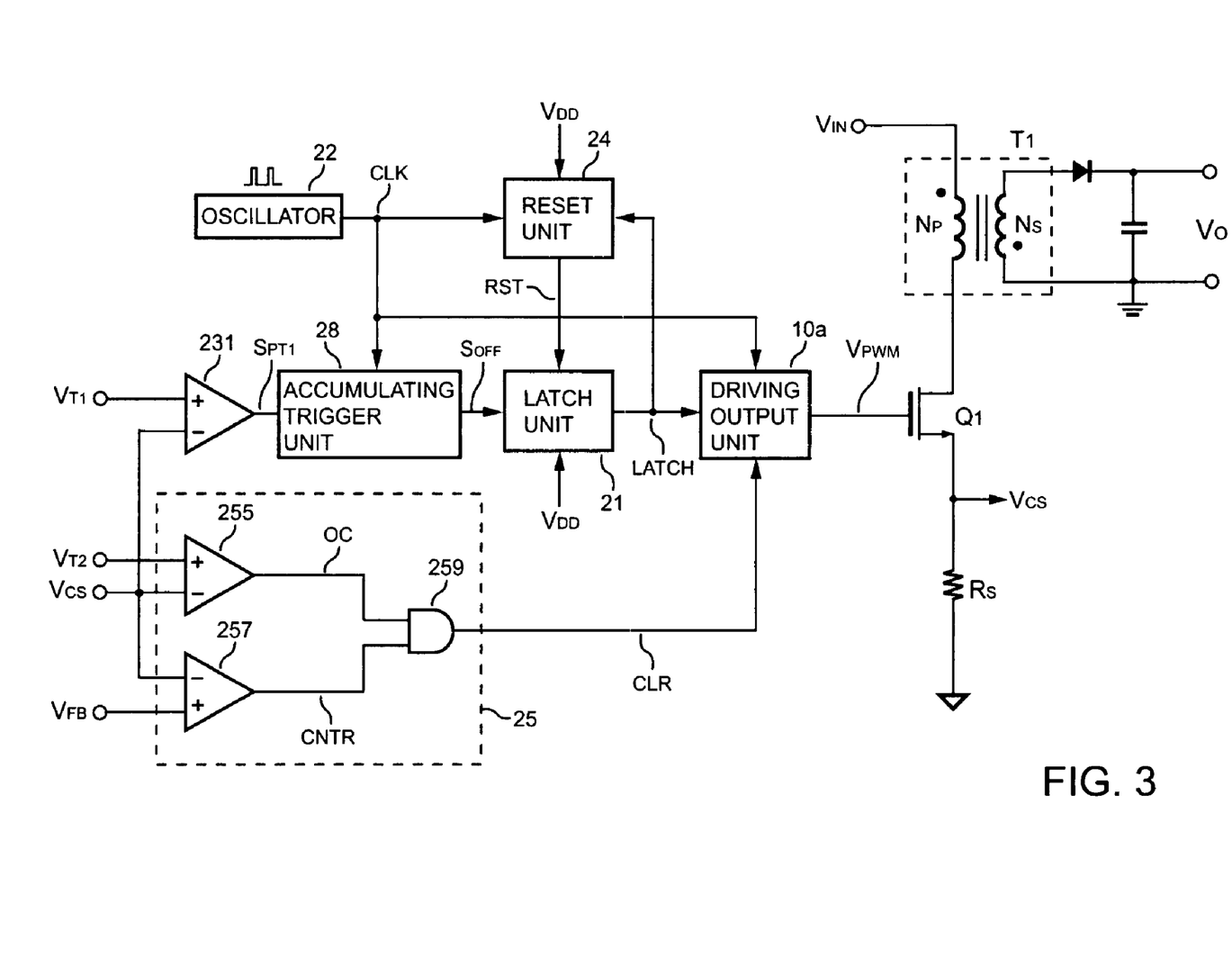
FIG. 3 shows a first preferred embodiment of a schematic diagram of the power converter according to the present invention.

Reference is made to FIG. 2 and a first preferred embodiment shown in FIG. 3 illustrating a schematic diagram of the power converter according to the present invention. The over-power comparative unit 23 is a current comparator 231. An input of the current comparator 231 receives a first threshold signal $V_{T1}$ and another input of the current comparator 231 receives a current sense signal $V_{CS}$. The current comparator 231 generates a first protection signal $S_{PT1}$ to the accumulating trigger unit 28 by comparing the first threshold signal $V_{T1}$ with the current sense signal $V_{CS}$.

The above-mentioned current sense signal $V_{CS}$ will increase as the power converter provides a high output power. The current comparator 231 is utilized to adjust the output power limit for the power converter by the first threshold signal $V_{T1}$. The current comparator 231 generates the first time of the first protection signal $S_{PT1}$ to the accumulating trigger unit 28 as the current sense signal $V_{CS}$ is higher than the first threshold signal $V_{T1}$. Meanwhile, the accumulating trigger unit 28 is to accumulate and count the first protection signal $S_{PT1}$ and output an off signal $S_{OFF}$ to the latch unit 21 as the first protection signal $S_{PT1}$ reaches to a predetermined clock counts. Therefore, the driving output unit 10a will stop generating the switching signal $V_{PWM}$ for latching off the switching signal $V_{PWM}$ to the power switch $Q_1$. By accumulating and counting the period of the fault conditions, the over-power protection circuit is used to avoid an improper protection as the power converter needs a larger output power in a certain period.

Figure 4:
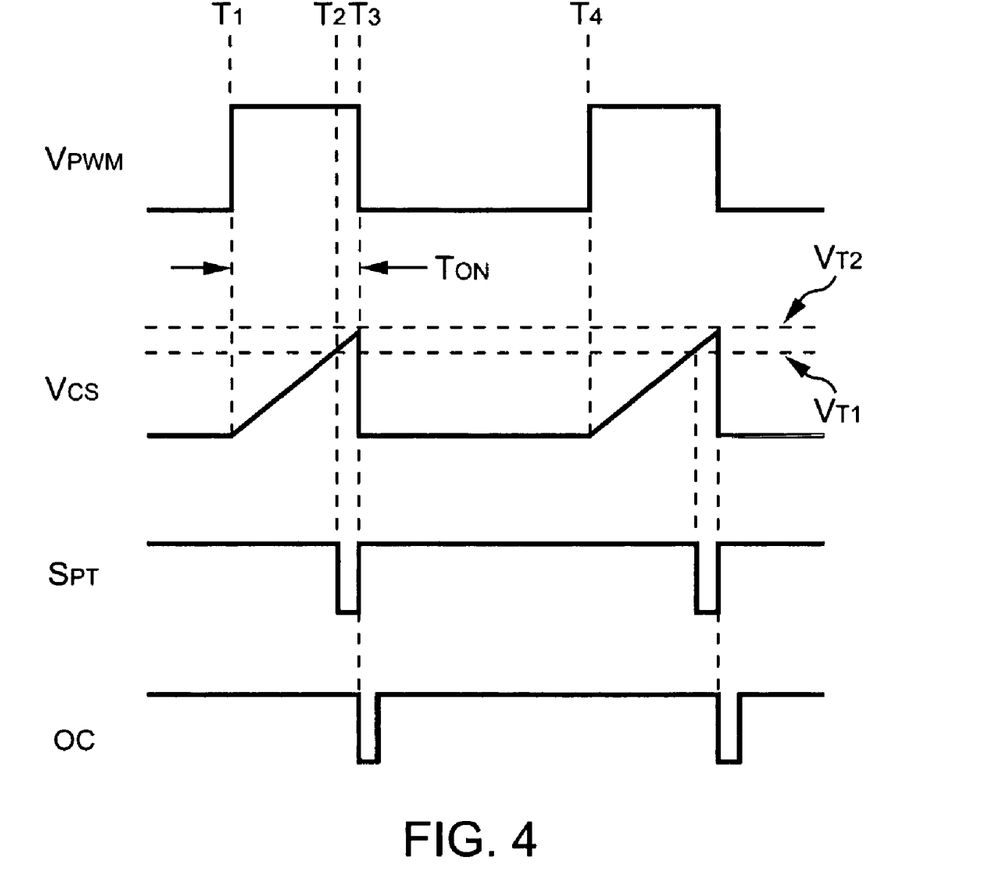
FIG. 4 shows the circuit waveforms of the power converter according to the present invention.

Reference is made to FIG. 3 and the circuit waveforms of the power converter shown in FIG. 4 according to the present invention. The driving output unit 10a outputs the switching signal $V_{PWM}$ (logic high) to turn on the power switch $Q_1$. Then the current sense signal $V_{CS}$ increases gradually in the interval $T_1 \sim T_2$. When the current sense signal $V_{CS}$ is higher than the first threshold signal $V_{T1}$, the current comparator 231 outputs the first protection signal $S_{PT1}$ (logic low) to the accumulating trigger unit 28 in the meantime (time $T_2$). Afterward, the accumulating trigger unit 28 starts to accumulate and count for latching off the driving output unit 10a.

Moreover, in the interval $T_2 \sim T_3$, the switching signal $V_{PWM}$ keeps the power switch $Q_1$ turned on, and the current sense signal $V_{CS}$ keeps on rising. Meanwhile, the driving control unit 25 outputs an over power signal OC (logic low) and a clear signal CLR (logic low) to the driving output unit 10a in the time $T_3$ once the current sense signal $V_{CS}$ is higher than the second threshold signal $V_{T2}$. The switching signal $V_{PWM}$ (logic low) is provided to turn off the power switch $Q_1$ periodically and limit the switching current $I_p$ in the interval $T_3 \sim T_4$. Therefore, the peak output power of the power converter is thus limited.

Figure 5:
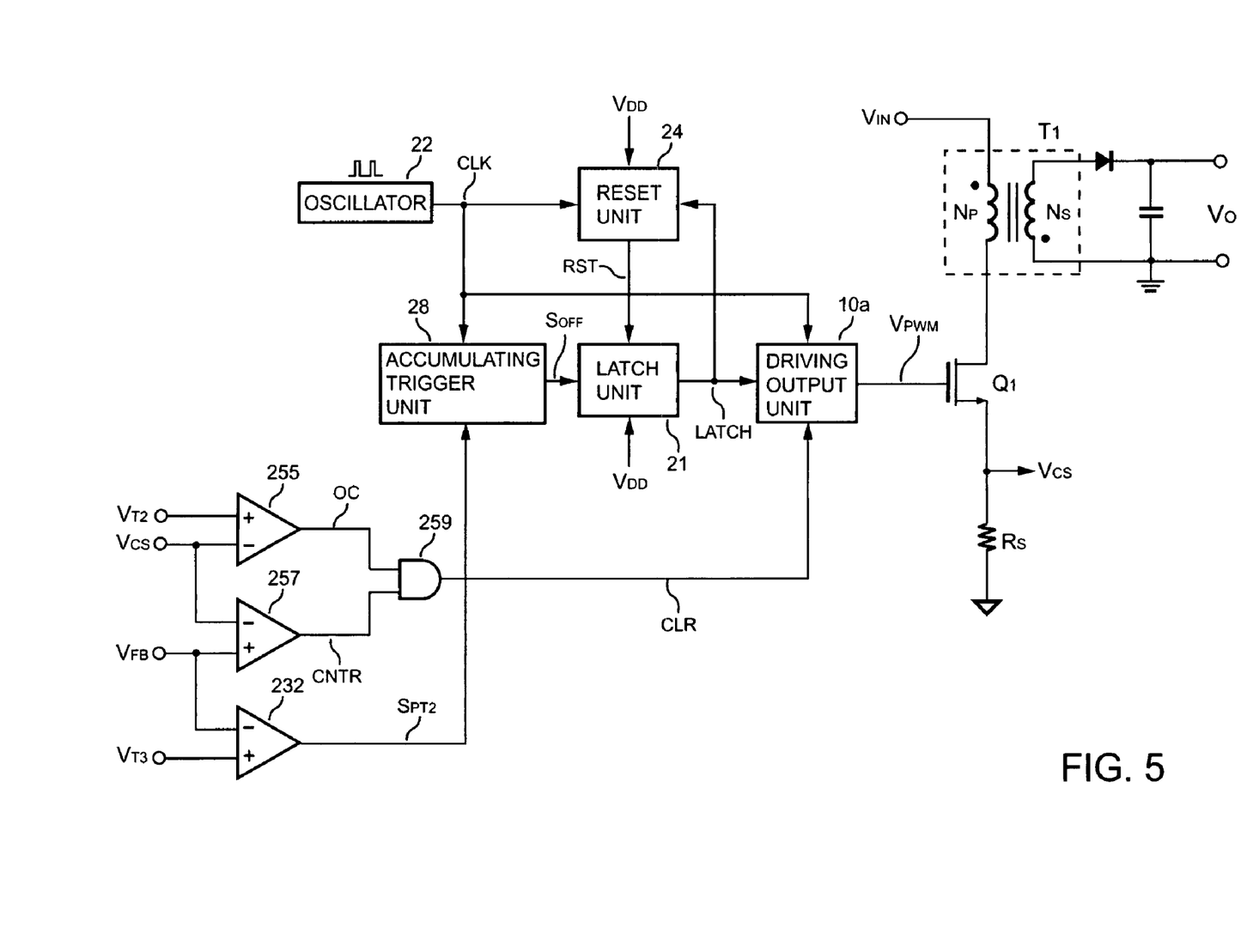
FIG. 5 shows a second preferred embodiment of a schematic diagram of the power converter according to the present invention.

Referring to FIG. 2, and a second preferred embodiment illustrated in FIG. 5, which shows a schematic diagram of the power converter according to the present invention. The over-power comparative unit 23 is a voltage comparator 232. An input of the voltage comparator 232 receives the third threshold signal $V_{T3}$ and another input of the voltage comparator 232 receives a voltage feedback sense signal $V_{FB}$. The voltage comparator 232 outputs the second protection signal $S_{PT2}$ to the accumulating trigger unit 28 by comparing the third threshold signal $V_{T3}$ with the voltage feedback sense signal $V_{FB}$.

The voltage feedback sense signal $V_{FB}$ rises relatively as requiring a high output power. The voltage comparator 232 and the third threshold signal $V_{T3}$ of the second preferred embodiment are used to adjust the protecting limitation of the output power. Then the voltage comparator 232 generates the first time for the second protection signal $S_{PT2}$ to the accumulating trigger unit 28 once the voltage feedback sense signal $V_{FB}$ is higher than the third threshold signal $V_{T3}$. In the meantime, the accumulating trigger unit 28 accumulates and counts the second protection signal $S_{PT2}$ and outputs an off signal $S_{OFF}$ to the latch unit 21 as the second protection signal $S_{PT2}$ reaches a predetermined clock counts. Therefore, the driving output unit 10a will stop generating the switching signal $V_{PWM}$ for latching off the switching signal $V_{PWM}$ to the power switch $Q_1$. Through accumulating and counting the period of the fault conditions, an over-power protection circuit can avoid an improper protection as a large output power is required in a very short period for the power converter.

Figure 6:
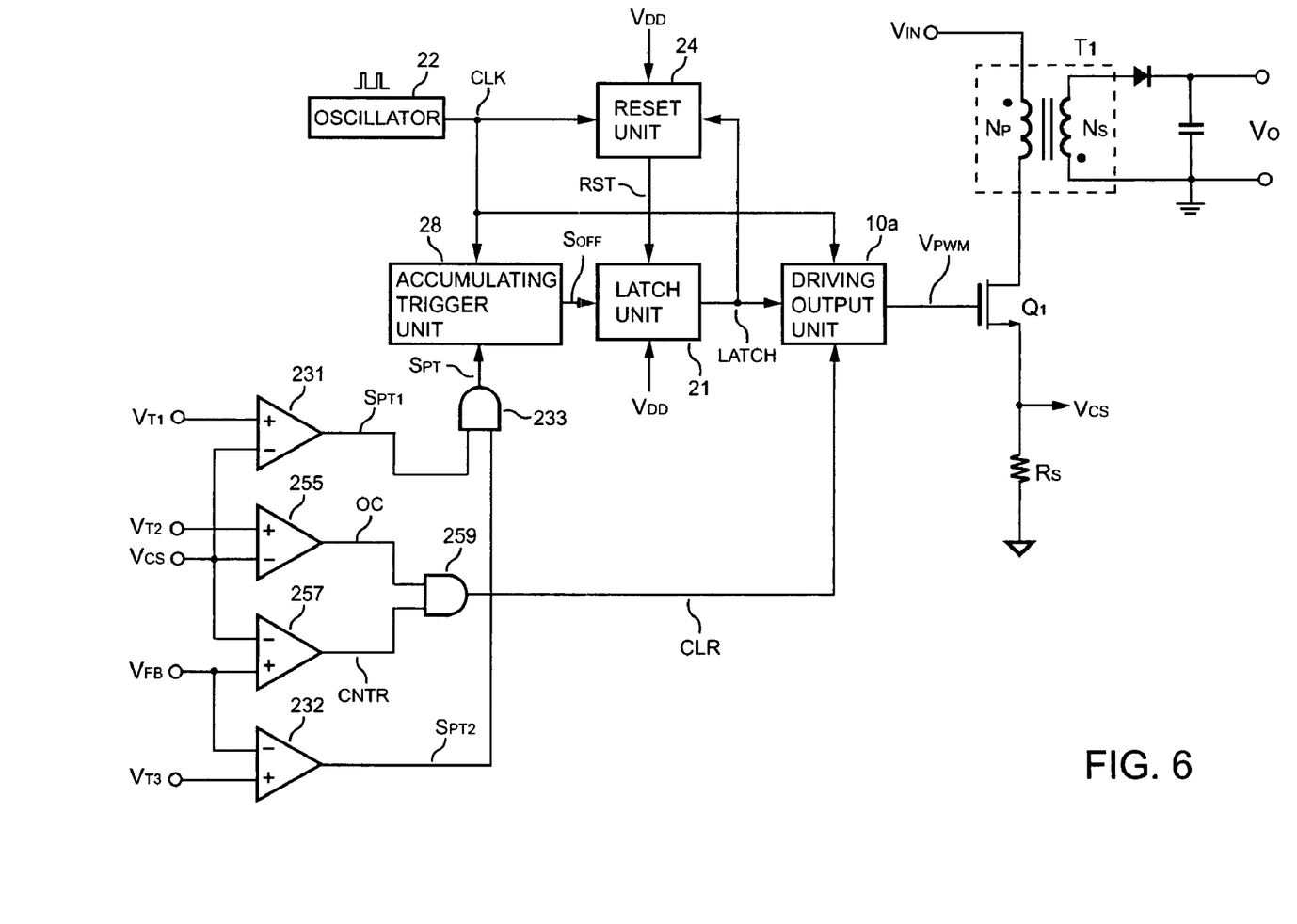
FIG. 6 shows a third preferred embodiment of a schematic diagram of the power converter according to the present invention.

Referring to FIG. 2, FIG. 6 shows a schematic diagram of the power converter in a third preferred embodiment according to the present invention. The over-power comparative unit 23 is composed of a current comparator 231, a voltage comparator 232 and a connecting unit 233. The current comparator 231 generates a first protection signal $S_{PT1}$ by comparing a first threshold signal $V_{T1}$ with a current sense signal $V_{CS}$. The voltage comparator 232 generates a second protection signal $S_{PT2}$ by comparing a third threshold signal $V_{T3}$ with the voltage feedback sense signal $V_{FB}$. The connecting unit 233 is connected to the current comparator 231, the voltage comparator 232 and the accumulating trigger unit 28 in response to the first protection signal $S_{PT1}$ and the second protection signal $S_{PT2}$.

The current sense signal $V_{CS}$ and the voltage feedback sense signal $V_{FB}$ rises relatively as requiring a high output power. The over-power comparative unit 23, the first threshold signal $V_{T1}$ and the third threshold signal $V_{T3}$ are used for the second preferred embodiment to adjust the protecting limitation of the output power. The current comparator 231 generates the first protection signal $S_{PT1}$ as the current sense signal $V_{CS}$ is higher than the first threshold signal $V_{T1}$ or the voltage comparator 232 generates the second protection signal $S_{PT2}$ as the voltage feedback sense signal $V_{FB}$ is higher than the third threshold signal $V_{T3}$. The connecting unit 233 outputs a protecting signal $S_{PT}$ to the accumulating trigger unit 28 in response to the first protection signal $S_{PT1}$ and the second protection signal $S_{PT2}$. In the meantime, the accumulating trigger unit 28 accumulates and counts the protection signal $S_{PT}$ and outputs an off signal $S_{OFF}$ to the latch unit 21 as the protection signal $S_{PT}$ reaches to a predetermined clock counts. Therefore, the driving output unit 10a will stop generating the switching signal $V_{PWM}$ for latching off the switching signal $V_{PWM}$ to the power switch $Q_1$. Through accumulating and counting the period of the fault conditions, an over-power protection circuit is to avoid an improper protection once a large output power is required in a very short period for the power converter.

Figure 7:
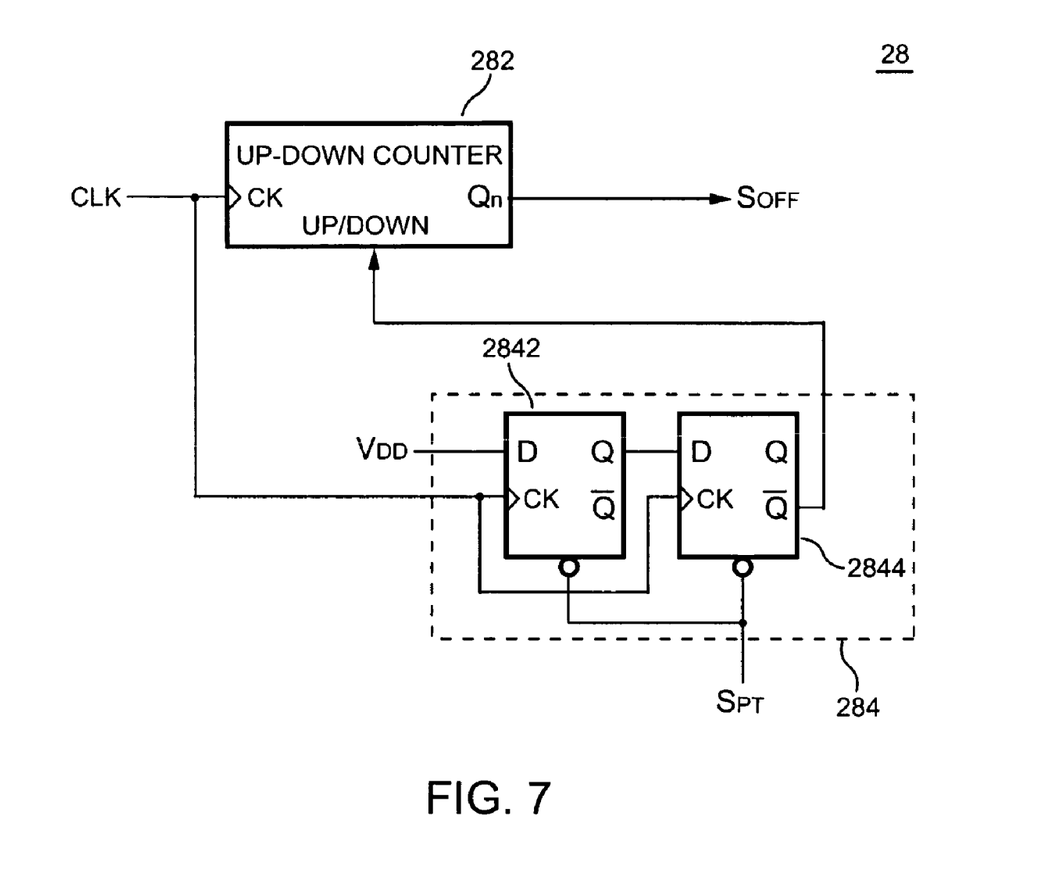
FIG. 7 shows a preferred embodiment of an accumulating trigger unit according to the present invention.

Referring to FIG. 2, FIG. 7 shows a preferred embodiment illustrating a schematic diagram of the accumulating trigger unit according to the present invention. The accumulating trigger unit 28 comprises a hold-up unit 284 that is coupled to the over-power comparative unit 23 and the oscillator 22 for generating a up-down signal UP/DOWN to delay the state of the protection signal $S_{PT}$ in response to the protection signal $S_{PT}$ and the clock signal CLK. A up-down counter unit 282 is coupled to the hold-up unit 284 and the oscillator 22 for stopping to count in the end of down count and outputting the off signal $S_{OFF}$ (logic high) in the end of up count in response to the up-down signal UP/DOWN and the clock signal CLK. The up-down counter unit 282 starts to up count as enabling the up-down signal UP/DOWN, and to down count as disabling the up-down signal UP/DOWN. The switching frequency of the switching signal $V_{PWM}$ and the hold-up time of the hold-up unit 284 are determined by the clock signal CLK.

As described above, the hold-up unit 284 is implemented by the D flip-flops 2842 and 2844. To prevent the noise interference from the ground bounce or the switching spike, the hold-up unit 284 associated with the clock signal CLK of the oscillator 22 are utilized to delay the state of the protection signal $S_{PT}$ for generating the up-down signal UP/DOWN (logic high) as the hold-up unit 284 receives the protecting signal $S_{PT}$ (logic low).

Figure 8:
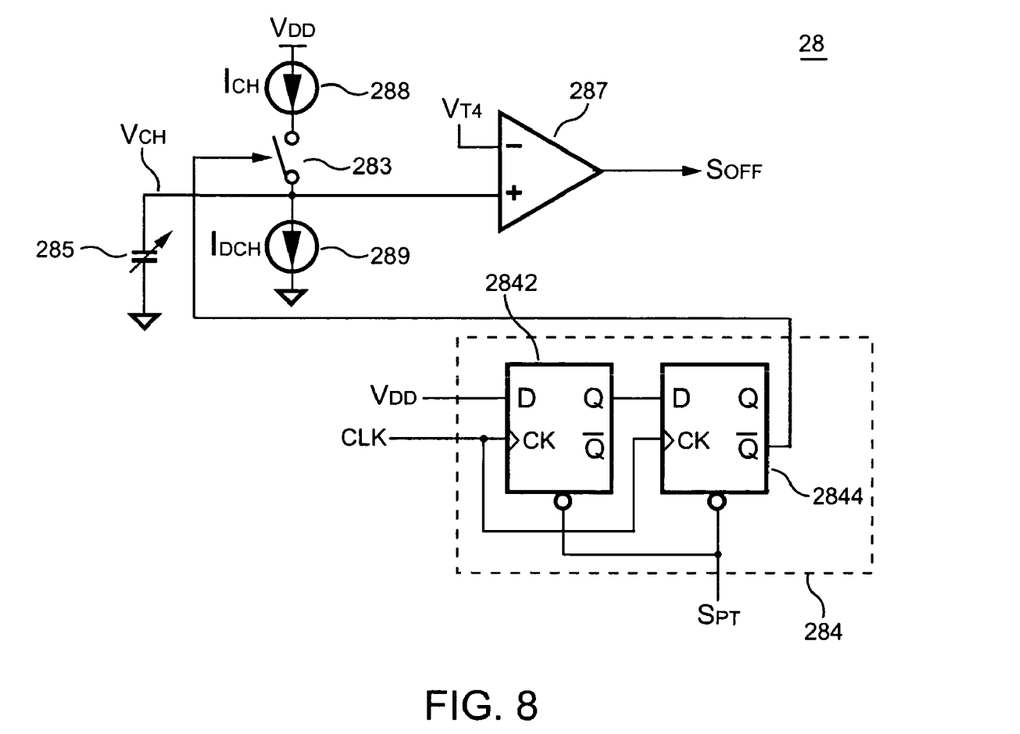
FIG. 8 shows another preferred embodiment of an accumulating trigger unit according to the present invention.

Referring to FIG. 2, and another preferred embodiment shown in FIG. 8, which illustrates a schematic diagram of the accumulating trigger unit according to the present invention. The accumulating trigger unit 28 comprises a hold-up unit 284 that is coupled to the over-power comparative unit 23 and the oscillator 22 for generating a up-down signal UP/DOWN to delay the state of the protection signal $S_{PT}$ in response to the protection signal $S_{PT}$ and the clock signal CLK. A switch 283 is coupled to the hold-up unit 284 for generating on/off state in response to the up-down signal UP/DOWN and enabling the protection signal $S_{PT}$. A programmable capacitor 285 is coupled to a charging current source 288 via the switch 283 for generating a charging current $I_{CH}$ and a charging voltage $V_{CH}$ in response to the on state of the switch 283. The programmable capacitor 285 is further coupled to a discharging current source 289 via the switch 283 for generating a discharging current $I_{DCH}$ to discharge the programmable capacitor 285 in response to the off state of the switch 283. A delay comparator 287 is coupled to the programmable capacitor 285 and a fourth threshold signal $V_{T4}$, which compare the charging voltage $V_{CH}$ with the fourth threshold signal $V_{T4}$ for generating the off signal $S_{OFF}$ as the charging voltage $V_{CH}$ is higher than the fourth threshold signal $V_{T4}$.

As described above, the hold-up unit 284 is implemented by the D flip-flops 2842 and 2844. To prevent the noise interference from the ground bounce or the switching spike, the hold-up unit 284 associated with the clock signal CLK of the oscillator 22 are utilized to delay the state of the protection signal $S_{PT}$ for generating the up-down signal UP/DOWN (logic high) as the hold-up unit 284 receives the protecting signal $S_{PT}$ (logic low).

The hold-up unit 284 generates the up-down signal UP/DOWN (logic high) and turns on the switch 283 as the hold-up unit 284 receives the protecting signal $S_{PT}$ (logic low) from the over-power comparative unit 23. The programmable capacitor 285 starts to charge via the charging current source 288. The delay comparator 287 outputs the off signal $S_{OFF}$ (logic high) once the charging voltage $V_{CH}$ of the programmable capacitor 285 is higher than the fourth threshold signal $V_{T4}$. In the other words, the switch 283 can change the on state to the off state as the over-power comparative unit 23 stops generating the protecting signal $S_{PT}$. Meanwhile, the charging voltage $V_{CH}$ of the programmable capacitor 285 starts to discharge via the discharging current source 289 and the delay comparator 287 stops generating the off signal $S_{OFF}$. Therefore, the duration of the accumulating and counting, and the period of fault conditions are changed by adjusting the capacitance of the programmable capacitor 285. In addition, the programmable capacitor 285 may place not only the outside of the switching controller but also a constant capacitance in the switching controller once the over-power protection circuit may build-in the switching controller of the power converter in accordance with present invention.

Referring FIG. 2, the latch unit 21 is implemented by a D flip-flop. The clock input of the latch unit 21 is coupled to the accumulating trigger unit 28 for generating the latch signal LATCH (logic low) in response to the off signal $S_{OFF}$ (logic high). A D-input of a D flip-flop of the driving output unit 10a receives the latch signal LATCH (logic low) to latch off the switching signal $V_{PWM}$.

Figure 9:
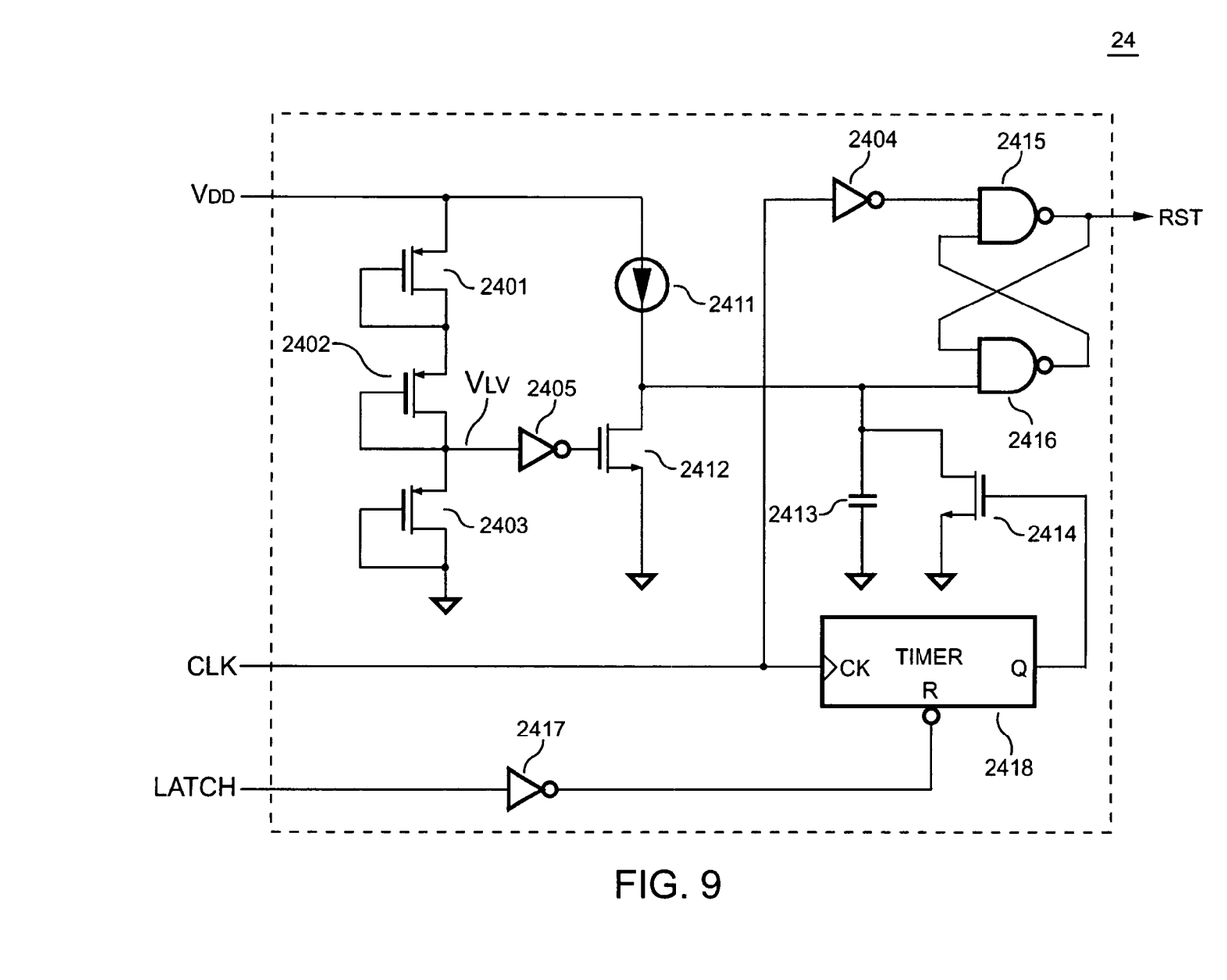
FIG. 9 shows a preferred embodiment of a reset circuit according to the present invention.

In view of FIG. 2, and referring to FIG. 9, which shows a schematic diagram of a preferred embodiment illustrating the reset unit according to the present invention. The reset unit 24 is coupled to the latch unit 21 and the oscillator 22 for generating the reset signal RST to reset the latch unit 21 after a time delay for enabling the latch signal LATCH in response to the clock signal CLK and the latch signal LATCH. The reset unit 24 is further coupled to a supply voltage $V_{DD}$ for receiving a low voltage signal and generates a reset signal RST to reset the latch unit 21 in response to the restart of the power source of the power converter.

The reset unit 24 comprises plural transistors 2401, 2402 and 2403 connected in series to generate a low voltage signal $V_{LV}$ for indicating a low supply voltage $V_{DD}$. The low voltage signal $V_{LV}$ controls the on/off of a transistor 2412 via an inverter 2405. A constant current source 2411 is applied to charge the capacitor 2413 once the supply voltage $V_{DD}$ is available and the transistor 2412 is off. Two NAND gates 2415, 2416 form a SR register. The first inputs of the NAND gates 2415, 2416 are connected to the outputs of the NAND gate 2416, 2415 respectively. The second input of the NAND gate 2416 is connected to the capacitor 2413. The second input of the NAND gate 2415 is connected to the clock signal CLK of the oscillator 22 through an inverter 2404. The reset signal RST (logic low) is therefore generated and enabled at the output of the NAND gate 2415 in response to a logic low state at the capacitor 2413. The reset signal RST is disabled after the capacitor 2413 is charged to a logic high state and the clock signal CLK is generated. The capacitance of the capacitor 2413 and the current of the constant current source 2411 determine the pulse width of the reset signal RST.

The reset unit 24 further comprises a transistor 2414, an inverter 2417 and a timer 2418. The transistor 2414 is connected in parallel with the capacitor 2413 for discharging the capacitor 2413. The output of the timer 2418 controls the on/off of the transistor 2414. The clock input of the timer 2418 is connected to the clock signal CLK for producing the time delay in accordance with the time base of the clock signal CLK. The reset input of the timer 2418 is coupled to the latch signal LATCH through an inverter 2417. The transistor 2414 is turned off, and the reset input of the timer 2418 is low level, and the output of the timer 2418 is low level in response to the disable of the latch signal LATCH (logic high). The timer 2418 will be enabled and the reset input of the timer 2418 is high level once the latch signal LATCH (logic low) is enabled. When the timer 2418 reaches its delay time, the output of the timer 2418 is high level. The transistor 2414 will be enabled to discharge the capacitor 2413 and generate the reset signal RST to reset the latch unit 21.

As described above, an over-power protection circuit for power converter provides a proper protection during the conditions for overloading, short-circuit and feedback open loop in accordance with present invention. Through accumulating and counting the period of the fault conditions, an over-power protection circuit is to avoid an improper protection once a large output power is required in a very short period for the power converter.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An over-power protection circuit for a power converter, comprising:
    an oscillator, generating a clock signal;
    a current comparator having a pair of inputs respectively coupled to a current sense signal and a first threshold signal for generating a protection signal at an output thereof responsive said current sense signal exceeding said first threshold signal;
    an accumulating trigger unit having a first input coupled to said output of said current comparator and a second input coupled to said oscillator for generating an off signal in response to receipt of said protection signal for a time period defined by a number of pulses of said clock signal;
    a latch unit coupled to said accumulating trigger unit for generating a latch signal in response to said off signal;
    a driving output unit coupled to said latch unit and said oscillator for generating a switching signal in response to said clock signal and said latch signal; wherein said latch signal is used to disable said switching signal to a power switch; and
    a driving control unit having an output coupled to said driving output unit for generating a clear signal for periodically disabling said switching signal, said driving control unit having respective inputs coupled to a voltage feedback signal, said current sense signal and a second threshold signal, wherein said clear signal disables said switching signal to said power switch responsive to said current sense signal being higher than said second threshold signal;
    wherein said accumulating trigger unit initiates a count of clock pulses responsive to receipt of said protection signal, said latch unit controls said driving output unit to latch off said switching signal to said power switch responsive to said protection signal being received by said accumulating trigger unit for a period defined by said number of clock pulses.

2. The over-power protection circuit for power converter of claim 1, further comprising a reset unit coupled to said latch unit and said oscillator for generating a reset signal to reset said latch unit in response to said clock signal and said latch signal; wherein said reset signal is generated after a time delay of said latch signal.

3. The over-power protection circuit for power converter of claim 2, wherein said reset unit is further coupled to a supply voltage, said reset unit generating a reset signal to reset said latch unit responsive to a low supply voltage signal corresponding to the restart of the power source of the power converter.

4. The over-power protection circuit for power converter of claim 1, wherein said accumulating trigger unit comprises:
    a hold-up unit, coupled to said output of said current comparator and coupled said oscillator for generating an up-down signal to delay a state of said protection signal in response to said protection signal and said clock signal; and
    an up-down counter unit, coupled to said hold-up unit and said oscillator for counting to an end of a down count and outputting said off signal at an end of an up count in response to said up-down signal and said clock signal.

5. The over-power protection circuit for power converter of claim 4, wherein said up-down counter unit starts to up count responsive to said up-down signal being in an enabling state, and to down count responsive to said up-down signal being in an disabling state.

6. The over-power protection circuit for power converter of claim 1, wherein said accumulating trigger unit comprises:
    a hold-up unit, coupled to said output of said current comparator and coupled said oscillator for generating a up-down signal to delay a state of said protection signal in response to said protection signal and said clock signal;
    a switch, coupled to said hold-up unit for generating on and off states in response to said up-down signal and states of said protection signal;
    a programmable capacitor, coupled to a charging current source via said switch for generating a charging current and a charging voltage in response to the on state of said switch, said programmable capacitor being further coupled to a discharging current source via said switch for generating a discharging current to discharge said programmable capacitor in response to the off state of said switch; and a delay comparator, coupled to said programmable capacitor and an off signal threshold signal, which compares said charging voltage with said off signal threshold signal for generating said off signal responsive to said charging voltage being higher than said off signal threshold signal.

7. An over-power protection circuit for a power converter, comprising:
an oscillator generating a clock signal at an output thereof;
a voltage comparator having a pair of inputs respectively coupled to a voltage feedback sense signal and a threshold signal for generating a protection signal at an output thereof responsive to said voltage feedback sense signal exceeding said threshold signal;
an accumulating trigger unit being coupled to both said output of said voltage comparator and said output of said oscillator for generating an off signal in response to receipt of said protection signal for a time period defined by a number of pulses of said clock signal;
a latch unit having an input coupled to said accumulating trigger unit for generating a latch signal in response to said off signal;
a driving output unit having inputs respectively coupled to said latch unit and said oscillator for generating a switching signal in response to said clock signal and said latch signal; wherein said latch signal is used to disable said switching signal to a power switch responsive to said off signal; and
a driving control unit coupled to said driving output unit for generating a clear signal in response to said voltage feedback sense signal, a current sense signal and a second threshold signal, said driving control unit including an over current comparator having a pair of inputs respectively coupled to said current sense signal and said second threshold signal, said clear signal being responsive to an output of said over current comparator corresponding to said current sense signal exceeding said second threshold signal to turn off said switching signal to said power switch;
wherein said latch unit controls said driving output unit to latch off said switching signal to said power switch responsive to said protection signal being input to said accumulating trigger unit for a period defined by said number of clock pulses.

8. The over-power protection circuit for power converter of claim 7, further comprising a reset unit coupled to said latch unit and said oscillator for generating a reset signal to reset said latch unit in response to said clock signal and said latch signal; wherein said reset signal is generated after a time delay of said latch signal.

9. The over-power protection circuit for power converter of claim 8, wherein said reset unit is further coupled to a supply voltage, said reset unit generating a reset signal to reset said latch unit responsive to a low supply voltage signal corresponding to the restart of the power source of the power converter.

10. The over-power protection circuit for power converter of claim 7, wherein said accumulating trigger unit comprises:
a hold-up unit coupled to both said output of said voltage comparator and said oscillator for generating an up-down signal to delay a state of said protection signal in response to said protection signal and said clock signal; and
an up-down counter unit coupled to said hold-up unit and said oscillator for counting to an end of a down count and outputting said off signal at an end of an up count in response to said up-down signal and said clock signal.

11. The over-power protection circuit for power converter of claim 10, wherein said up-down counter unit starts to up count responsive to said up-down signal being in an enabling state, and to down count responsive to said up-down signal being in a disabling state.

12. The over-power protection circuit for power converter of claim 7, wherein said accumulating trigger unit comprises:
a hold-up unit coupled to said output of said voltage comparator and being coupled to said oscillator for generating a up-down signal to delay a state of said protection signal in response to said second protection signal and said clock signal;
a switch coupled to said hold-up unit for generating on and off states in response to said up-down signal and states of said protection signal;
a programmable capacitor coupled to a charging current source via said switch for generating a charging current and a charging voltage in response to the on state of said switch, said programmable capacitor being further coupled to a discharging current source via said switch for generating a discharging current to discharge said programmable capacitor in response to the off state of said switch; and
a delay comparator coupled to said programmable capacitor and an off signal threshold signal, which compares said charging voltage with said off signal threshold signal for generating said off signal responsive to said charging voltage being higher than said off signal threshold signal.

13. An over-power protection circuit for a power converter, comprising:
an oscillator for generating a clock signal;
an over-power comparative unit, said over-power comparative unit including (a) a first comparator having a pair of inputs respectively coupled to a current threshold signal and a current sense signal for generating a first protection signal, (b) a second comparator having a pair of inputs respectively coupled to a voltage threshold signal and a voltage feedback sense signal for generating a second protection signal, and (c) a first connecting unit having a pair of inputs respectively coupled an output of said first comparator and an output of said second comparator for generating an over-power protection signal in response to receipt of said first protection signal and said second protection signal;
an accumulating trigger unit coupled to said first connecting unit and said oscillator for generating an off signal in response to said over-power protection signal and said clock signal;
a latch unit coupled to said accumulating trigger unit for generating a latch signal in response to said off signal;
a driving output unit coupled to said latch unit and said oscillator for generating a switching signal in response to said clock signal and said latch signal; wherein said latch signal is used to disable said switching signal to a power switch; and
a driving control unit coupled to said driving output unit for generating a clear signal, said driving control unit including (a) a third comparator having a pair of inputs respectively coupled to a second current threshold signal and said current sense signal for generating an over-current signal, (b) a fourth comparator having a pair of inputs respectively coupled to said current sense signal and said voltage feedback sense signal for generating a switching control signal, and (c) a second connecting unit having a pair of inputs respectively coupled an output of said third comparator and an output of said fourth comparator for generating said clear signal to periodically turn off said switching signal to said power switch responsive to receipt of said switching control signal and for generating said clear signal to turn off said switching signal to said switch responsive to receipt of said over-current signal;

wherein said switching signal to said power switch is turned off responsive to output of said over-current signal or output of said over-power protection signal for a time period greater than a period defined by a number of clock pulses.

14. The over-power protection circuit for power converter of claim 13, further comprising a reset unit coupled to said latch unit and said oscillator for generating a reset signal to reset said latch unit in response to said clock signal and said latch signal; wherein said reset signal is generated after a time delay of said latch signal.

15. The over-power protection circuit for power converter of claim 14, wherein said reset unit is further coupled to a supply voltage, said reset unit generating a reset signal to reset said latch unit responsive to a low supply voltage signal corresponding to the restart of the power source of the power converter.

16. The over-power protection circuit for power converter of claim 13, wherein said accumulating trigger unit comprises:
 a hold-up unit coupled to both said output of said first connecting unit and said oscillator for generating an up-down signal to delay a state of said protection signal in response to said protection signal and said clock signal; and
 an up-down counter unit coupled to said hold-up unit and said oscillator for counting to an end of a down count and outputting said off signal at an end of an up count in response to said up-down signal and said clock signal.

17. The over-power protection circuit for power converter of claim 16, wherein said up-down counter unit starts to up count responsive to said up-down signal being in an enabling state, and to down count responsive to said up-down signal being in a disabling state.

18. The over-power protection circuit for power converter of claim 13, wherein said accumulating trigger unit comprising:
 a hold-up unit coupled to said output of said connecting unit and being coupled to said oscillator for generating a up-down signal to delay a state of said protection signal in response to said second protection signal and said clock signal;
 a switch coupled to said hold-up unit for generating on and off states in response to said up-down signal and states of said protection signal;
 a programmable capacitor coupled to a charging current source via said switch for generating a charging current and a charging voltage in response to the on state of said switch, said programmable capacitor being further coupled to a discharging current source via said switch for generating a discharging current to discharge said programmable capacitor in response to the off state of said switch; and
 a delay comparator coupled to said programmable capacitor and an off signal threshold signal, which compares said charging voltage with said off signal threshold signal for generating said off signal responsive to said charging voltage being higher than said off signal threshold signal.

* * * * *